E. F. HATHAWAY.
CALIPER GAGE.
APPLICATION FILED JAN. 6, 1908.
931,759.                                    Patented Aug. 24, 1909.
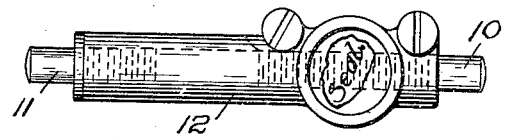
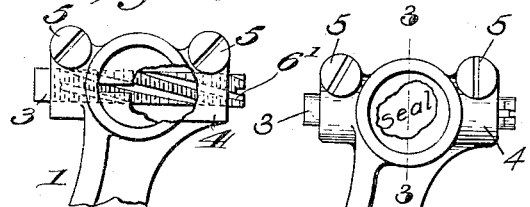
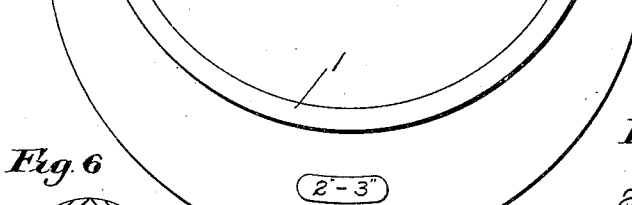
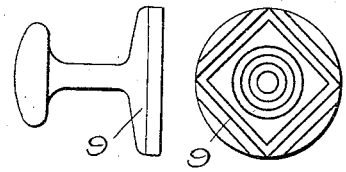
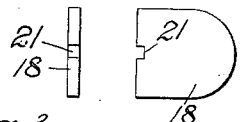
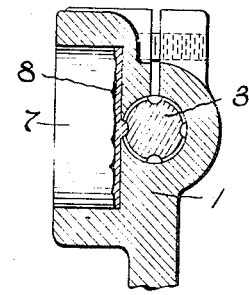
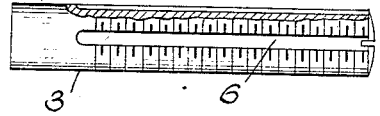
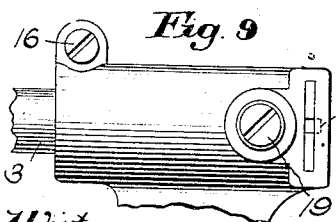
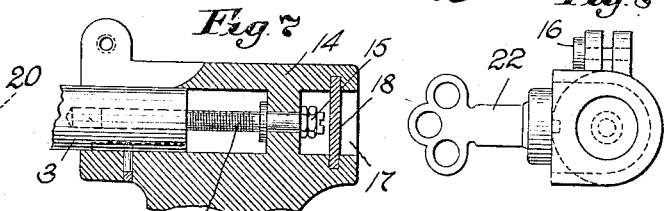
Witnesses:
Robert H. Kammler
Horace H. Crossman
Inventor:
Edgar F. Hathaway
by Emery Booth
Attys.

UNITED STATES PATENT OFFICE.

EDGAR F. HATHAWAY, OF DORCHESTER, MASSACHUSETTS.

CALIPER-GAGE.

931,759.  Specification of Letters Patent.  Patented Aug. 24, 1909.

Application filed January 6, 1908. Serial No. 409,389.

*To all whom it may concern:*

Be it known that I, EDGAR F. HATHAWAY, a citizen of the United States, and residing at Dorchester, in the county of Suffolk and State of Massachusetts, have invented an Improvement in Caliper-Gages, of which the following description, in connection with the accompanying drawings, is a specification, like numerals on the drawings representing like parts.

My invention relates to caliper gages for measuring either inside diameters or distances, being intended more particularly to provide a gage which may be adjusted so as to serve at different times as a reference or standard for different work, but which, after adjustment to any selected condition cannot be re-adjusted by any unauthorized person without leaving visible evidences of such attempt.

In machine-shop practice it is frequent where large numbers of duplicate parts are finished, to provide non-adjustable gages, to the measurements of which such finished parts must conform, which gages, however, are expensive and are not warranted unless the scale of manufacture is extensive. Where a lesser number of duplicate parts are to be finished standard gages are employed, but the same are made adjustable, so that after the completion of the parts upon which they are employed they may be utilized for other work by a change in adjustment. Where such gages are made adjustable, however, it is difficult to prevent the accidental alteration of the adjustment through carelessness, and an accuracy being often necessary within a fractional part of one one-thousandth of an inch, such alteration could not be perceived without careful measurement. In many cases, too, intentional change in adjustment is made for purposes of deception. For example, it frequently happens that a workman, having finished a piece of too small an outside diameter, or too large an inside diameter, will thereupon adjust the gage to correspond, so that on inspection the error will appear to be that of the gage and not due to his own fault or carelessness.

One object of my invention is to provide a gage in which the selected condition of adjustment cannot be altered through carelessness or intention without leaving apparent and visible evidence of such fact.

My invention will be best understood by reference to the following description of one specific embodiment thereof, while its scope will be more particularly pointed out in the appended claims.

In the drawings:—Figure 1 shows in side elevation a caliper gage for measuring outside diameters, embodying one form of my invention; Fig. 2 shows a similar gage for measuring inside diameters; Fig. 3 is a partial section, on an enlarged scale, taken on the line 3—3 in Fig. 1; Fig. 4 is a view also on an enlarged scale of the adjustable gage spindle; Fig. 5 is a side elevation of the sealing die employed in connection with the gage shown in Fig. 1; Fig. 6 is an end view thereof; Fig. 7 is a detail sectional view showing the application of a lock to the gage illustrated in Fig. 1; Fig. 8 is an end view of the same; Fig. 9 is a side elevation of the parts shown in Fig. 7; Fig. 10 is an end view of the sliding closure employed, with the gage of Fig. 7; Fig. 11 is a side elevation thereof, and Fig. 12 is a view showing a pin with helical grooves.

Referring to the drawings and to the illustrated embodiment of my invention there shown, I have illustrated in Fig. 1 a caliper gage for measuring outside diameters. The latter comprises the jaw-shaped holding member 1 having at one end the preferably fixed and hardened steel gage member 2, and at the opposite end a similar but adjustable gage member 3, the latter comprising a threaded pin or spindle, as shown in Fig. 4. The adjustable gage member 3 has threaded engagement with the walls of the split threaded socket portion 4 of the holder 1, so that it may be adjusted toward or from the fixed gage member 2 with a sufficient degree of sensitiveness or refinement for the intended purposes of use. From some conditions of work an adjustment of the intervening distance between the two gage members may be required within an accuracy of the fractional part of a thousandth of an inch. After adjustment to its selected position the gage member 3 is adapted to be held in fixed position and against displacement by any suitable means, such as the clamping screws 5, which are adapted to clamp together the split socket member about the threaded pin. In this condition the gage is adapted for use as is the ordinary adjustable caliper. In order, however, to leave the gage in such condition that it cannot again be adjusted except by the foreman or other authorized person, means are preferably provided associated with the holding means, so that the gage cannot be readjusted by unauthorized persons without leaving visible evidences of the attempt. Any suitable means may be employed for this purpose, but in the gage represented in Fig. 1 the threaded gage member 3 is provided with a plurality of longitudinal grooves 6 and the socket member 4 is provided with an open pocket or recess 7 having an opening at its bottom with which the said grooves are adapted to register one by one as the pin is turned for adjustment. When the gage is adjusted one of these grooves is left to coincide with the opening in the pocket 7. If the threads upon the adjustable gage member are so coarse that this cannot be done without leaving the gage in a materially different adjustment from that desired, the pin may be provided with a greater number of grooves than shown, or the same may be distributed in helical fashion along the pin, or the pocket opening may be of greater extent, so that in any event the pocket may be made to coincide with one or more longitudinally arranged depressions in the face of the screw. The gage having been adjusted in this fashion it may then be left in a sealed condition by filling the bottom of the pocket with suitable fusible or other sealing material 8, such as melted lead, Babbitt metal or even sealing wax or the like, which latter will enter the opening in the pocket and penetrate into the grooves of the screw, so that the latter cannot be turned without breaking the seal. The foreman or other authorized person performing this sealing preferably applies to the sealing member 8 a suitable sealing die or member 9 to leave a permanent impression thereon. Such die member may be of any suitable character, but is preferably such as to preclude counterfeiting and being retained by the foreman or other like authorized person, the gage cannot thereafter be readjusted and resealed without his knowledge or consent.

In Fig. 2 I have shown an inside caliper gage for measuring inside diameters having the adjustable gage member 10 and the fixed or non-adjustable gage member 11, the two being held in the plug-shaped holder 12 in substantially the same fashion as are the two gage members in the jaw-shaped holder 1 of the first described gage. The gage shown in Fig. 2, therefore, requires no further description than that already given, its construction and utility being obvious from what precedes.

Other means may be employed than the sealing material for preventing the readjustment of the gage, and other means may also be employed than the sealing die 9 shown for placing the gage in a condition where it cannot be readjusted without leaving apparent evidences of the attempt.

In Figs. 7-9 I have shown the adjustable member 3 provided with an adjusting device, such as the rotatable threaded stud 13, held against longitudinal movement in the socket portion 14, but adapted to be turned for adjustment of the gage member through engagement by a screw-driver with the slotted head. Suitable locking nuts 15 are provided for locking the threaded stud in position after adjustment, and the socket portion is partially split and provided with a clamping screw 16 to clamp the gage member fast in position after adjustment. Access is had to the slotted head of the threaded stud through an opening in the pocket at the rear of the socket portion, the said pocket, however, being closed by the sliding closure 18 after adjustment has been effected. After the pocket has been closed by the sliding closure 18, the latter is then locked permanently by means of the lock 19 which is carried by the socket portion, the locking bolt 20 thereof being adapted to enter a notch 21 in the edge of the sliding closure. Readjustment of the gage by preventing access to the pocket 17 being thus effected the key 22 is withdrawn from the lock and retained by the foreman.

In both embodiments of my invention, therefore, as shown in Figs. 1-6 and Figs. 7-11, respectively, the gage cannot be adjusted by unauthorized persons without leaving visible evidences of such adjustment,— in the one case through the breaking of the lock, or in the other the breaking of the seal.

It will be obvious that my invention may be embodied in various other specific forms than those shown, but that the latter being submitted for illustrative purposes only, details of construction and form and relative arrangement of parts may be widely varied without departing from the spirit of the invention.

Claims.

1. An adjustable caliper gage having a threaded socket member, and a threaded adjustable gage member therein being provided also with a recess opening into the threaded walls of the socket member, and sealing material within said recess engaging the threaded adjustable member said material having an exposed, impress receiving surface.

2. An adjustable caliper gage having a threaded adjustable gage member provided with one or more grooves extending lengthwise the same, and means for sealing the same in any fixed position of adjustment consisting of sealing material brought into engagement with the said groove and having, when positioned, an exposed, impress receiving surface.

3. An adjustable caliper gage having an adjustable gage member, an exposed body of impress receiving sealing material therefor, and a recess into which said sealing material is introduced and through which it engages said adjustable gage member.

4. An adjustable caliper gage having a socket member, an adjustable gage member, the walls of said member being split and provided with clamping screws to clamp said adjustable gage member therein, and with an exteriorly open recess extending through said wall, and sealing material in said recess adapted to be brought into contact with said gage member said sealing material, when positioned, having an exposed, impress receiving surface.

5. An adjustable caliper gage comprising in combination a holding member, an adjustable gage mounted therein, said holding member having applied thereto and in effective sealing contact with the said adjustable gage member, an exposed body of impress receiving, sealing material.

6. An adjustable caliper gage having an adjustable gage member, a cavity in the face of said gage, and impress receiving sealing material introduced wholly within said cavity to seal the gage member against readjustment, said material, when positioned within said cavity, having an exposed, impress receiving surface.

7. A micrometer gage having an interiorly threaded, longitudinally split socket member, a threaded and longitudinally grooved gage member adjustably mounted in said socket member, said socket member having a recess on the side thereof communicating with the interiorly threaded surface thereof and exposing the longitudinal grooves of the gage member when the latter is in position, clamping means to clamp the split portion of the socket about the gage member, and impress receiving sealing material for filling the botfom of the recess and the exposed portion of the grooves for sealing the gage member in any selected position of adjustment, said material, when positioned in said recess, having an exposed, impress receiving surface.

In testimony whereof, I have signed my name to this specification, in the presence of two subscribing witnesses.

EDGAR F. HATHAWAY.

Witnesses:
Thomas B. Booth,
Everett S. Emery.